(12) United States Patent
Curran et al.

(10) Patent No.: US 9,099,159 B1
(45) Date of Patent: Aug. 4, 2015

(54) DISK DRIVE GENERATING QUALITY METRIC MAP FOR A DATA TRACK WHILE IN DIFFERENT CONFIGURATIONS

(71) Applicant: Western Digital Technologies, Inc., Irvine, CA (US)

(72) Inventors: Kevin S. Curran, Lake Forest, CA (US); Anthony E. Pione, Irvine, CA (US); Jinghuan Chen, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/960,088

(22) Filed: Aug. 6, 2013

(51) Int. Cl.
*G11B 5/09* (2006.01)
*G11B 20/18* (2006.01)
*G11B 5/55* (2006.01)
*G11B 20/10* (2006.01)
G11B 27/36 (2006.01)

(52) U.S. Cl.
CPC .............. *G11B 20/18* (2013.01); *G11B 5/5547* (2013.01); *G11B 20/10009* (2013.01); *G11B 27/36* (2013.01); *G11B 2020/10916* (2013.01)

(58) Field of Classification Search
None
See application file for complete search history.

(56) References Cited

U.S. PATENT DOCUMENTS

| | | | |
|---|---|---|---|
| 5,121,263 A | 6/1992 | Kerwin et al. | |
| 6,130,794 A | 10/2000 | Christensen | |
| 7,050,252 B1* | 5/2006 | Vallis | 360/53 |
| 7,088,547 B1* | 8/2006 | Wang et al. | 360/77.04 |
| 7,155,660 B1 | 12/2006 | Burd | |
| 7,184,237 B2 | 2/2007 | Shi | |
| 7,191,083 B2 | 3/2007 | Ashley et al. | |
| 7,562,282 B1 | 7/2009 | Rothberg | |
| 7,898,756 B1 | 3/2011 | Wang | |
| 8,014,094 B1* | 9/2011 | Jin | 360/31 |
| 8,060,810 B2 | 11/2011 | Chakrabartty | |
| 8,120,871 B1* | 2/2012 | Sutardja et al. | 360/77.04 |
| 8,149,528 B1 | 4/2012 | Suratman et al. | |
| 8,194,338 B1* | 6/2012 | Zhang | 360/31 |
| 8,296,637 B1 | 10/2012 | Varnica et al. | |
| 8,310,775 B1* | 11/2012 | Boguslawski et al. | 360/31 |
| 8,483,027 B1* | 7/2013 | Mak et al. | 369/53.31 |
| 2003/0202268 A1* | 10/2003 | Wang et al. | 360/31 |
| 2007/0086301 A1 | 4/2007 | Yamakawa | |
| 2008/0007854 A1 | 1/2008 | Lin et al. | |
| 2008/0186617 A1* | 8/2008 | Hosono et al. | 360/77.02 |
| 2010/0238778 A1* | 9/2010 | Chen et al. | 369/53.35 |
| 2014/0032999 A1* | 1/2014 | Zhang et al. | 714/799 |

* cited by examiner

*Primary Examiner* — Dismery Mercedes

(57) ABSTRACT

A disk drive is disclosed comprising a disk comprising a plurality of servo tracks defined by servo sectors, a head actuated over the disk, and control circuitry comprising a read channel. A plurality of data tracks are defined relative to the servo tracks, wherein each data track comprises a plurality of segments. The read channel is configured into a read mode in order to first read a first segment of a first data track. During the first read, a quality metric is generated at periodic points along the first segment. After the first read, the read channel is configured into a non-read mode for a predetermined interval. After the predetermined interval, the read channel is configured into the read mode in order to second read the first segment of the first data track and generate the quality metric at the periodic points along the first segment.

22 Claims, 7 Drawing Sheets

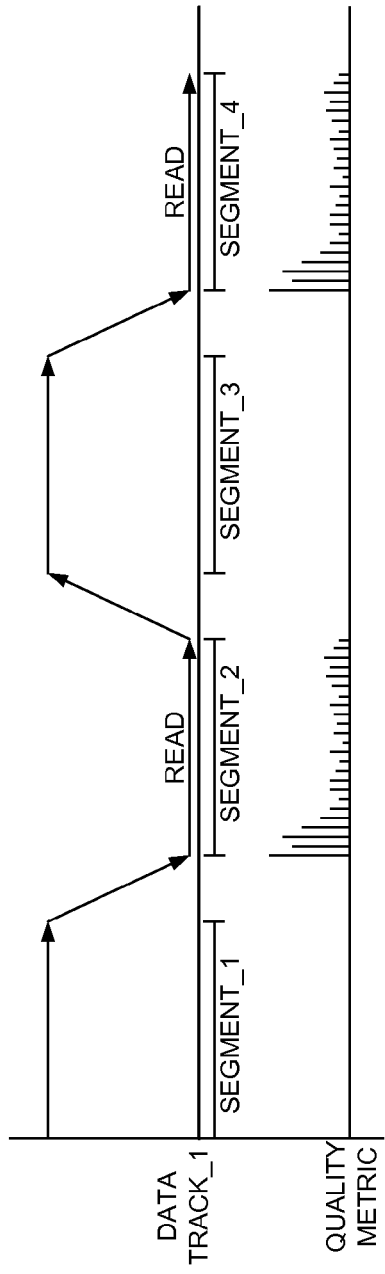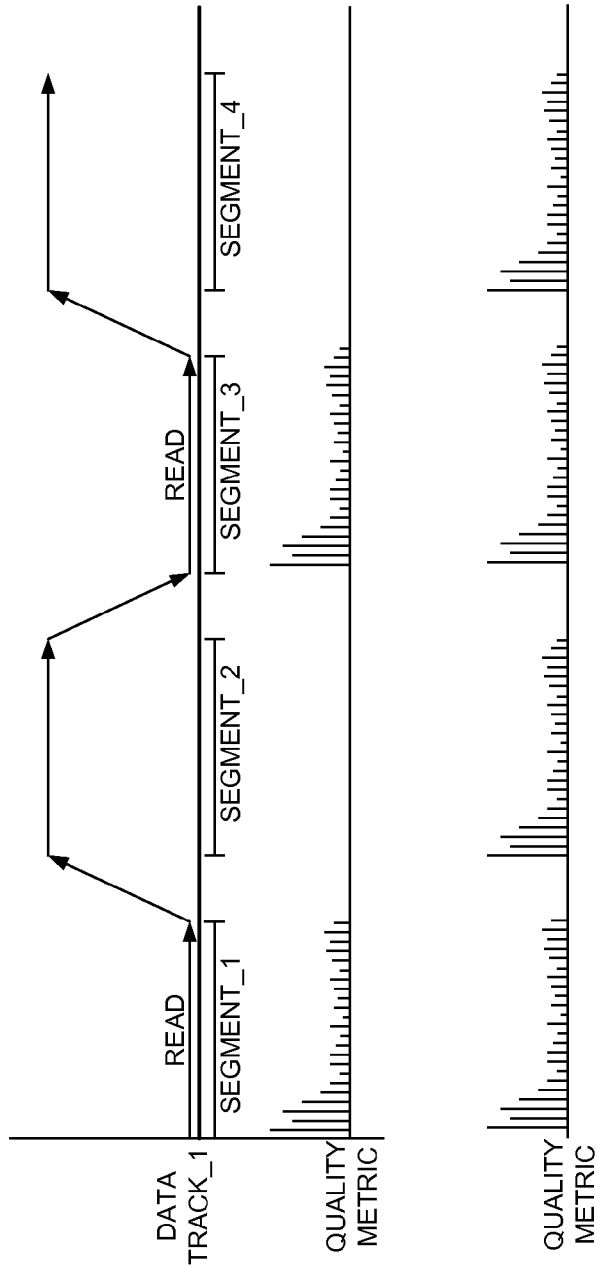
FIG. 4A
FIG. 4B
FIG. 4C

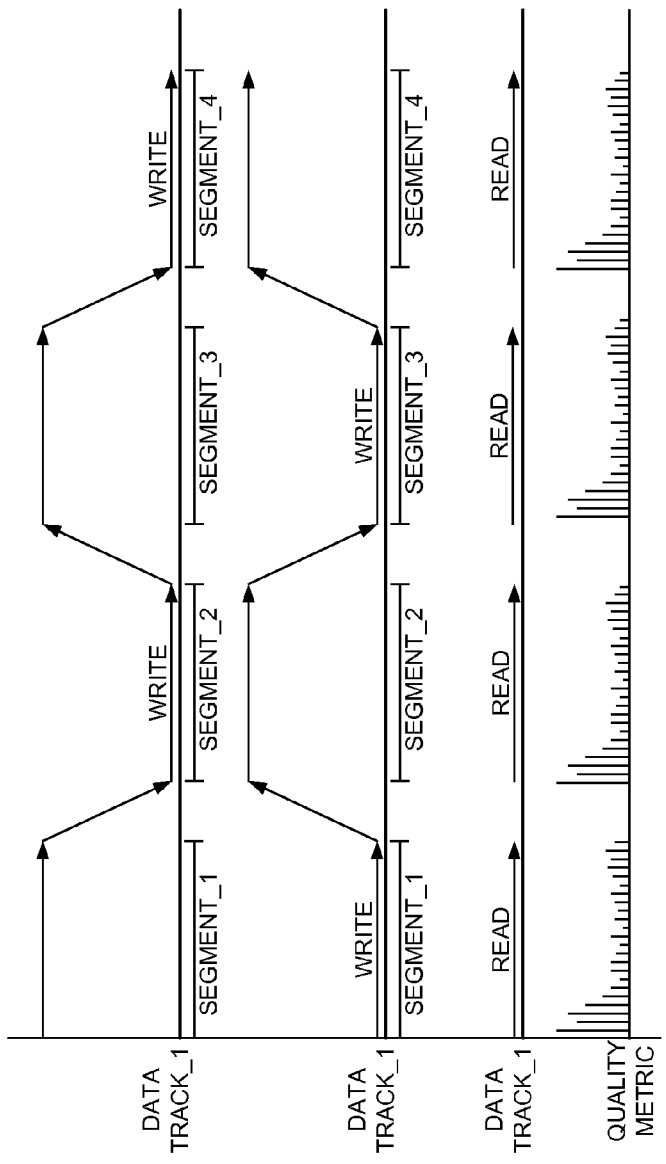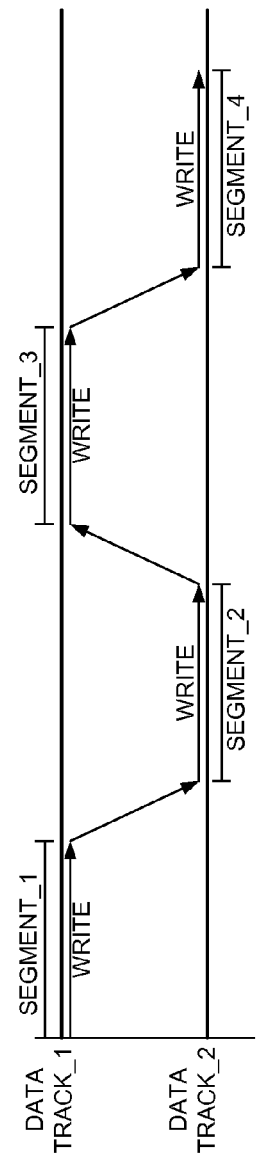
FIG. 6C
FIG. 6D

US 9,099,159 B1

DISK DRIVE GENERATING QUALITY METRIC MAP FOR A DATA TRACK WHILE IN DIFFERENT CONFIGURATIONS

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 4A illustrates an embodiment wherein a seek away and back to the first data track is executed during the non-read mode while reading multiple segments from the first data track and generating quality metrics for each segment.

FIG. 4B illustrates an embodiment wherein additional segments of the first data track are read and quality metrics generated for each segment.

FIG. 4C illustrates an embodiment wherein the quality metrics for all of the segments of the first data track are combined to generate a quality metrics map for the first data track.

FIG. 6C illustrates an embodiment wherein the control circuitry seeks the head away and then back to the first track while writing data to the first data track.

FIG. 6D illustrates an embodiment wherein the control circuitry seeks the head between first and second data tracks in order to generate quality metrics for segments of each data track.

DETAILED DESCRIPTION

Figure 1:
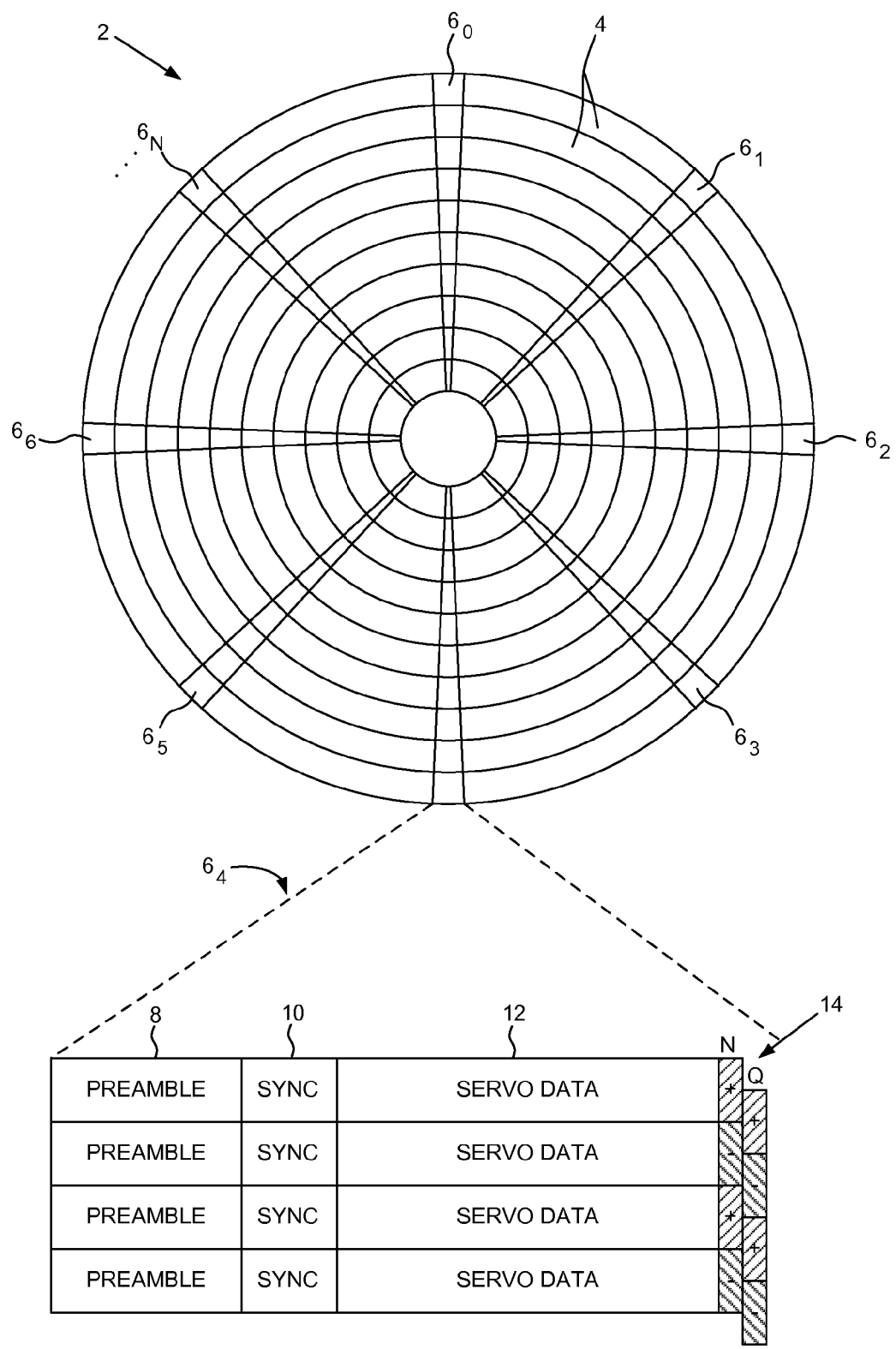
FIG. 1 shows a prior art disk format comprising a plurality of servo tracks defined by servo sectors.
Figure 2:
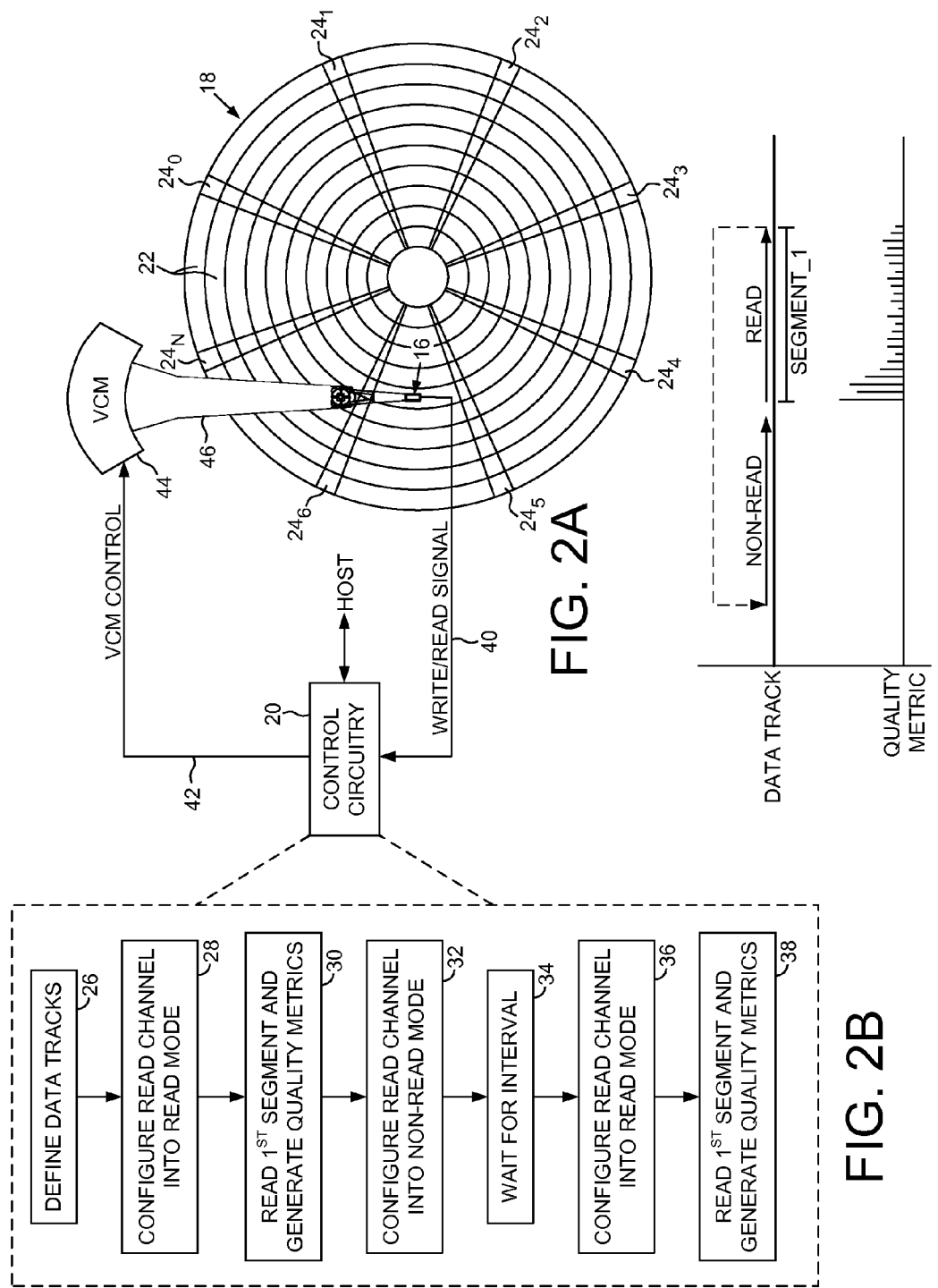
FIG. 2A shows a disk drive according to an embodiment comprising a head actuated over a disk and control circuitry comprising a read channel.
FIG. 2B is a flow diagram according to an embodiment wherein a read channel is configured into a non-read mode and then into a read mode in order to read a first segment of a first data track and generate a quality metric at periodic points along the first segment.
FIG. 2C shows an embodiment wherein the quality metrics generated for the first segment indicate a problem with initializing the read channel during a read operation.

FIG. 2A shows a disk drive according to an embodiment comprising a head 16 actuated over a disk 18 by control circuitry 20 comprising a read channel. The disk 18 comprises a plurality of servo tracks 22 defined by servo sectors $24_0$-$24_N$. The control circuitry 20 is operable to execute the flow diagram of FIG. 2B, wherein a plurality of data tracks are defined relative to the servo tracks (block 26), and each data track comprises a plurality of segments. The read channel is configured into a read mode (block 28) in order to first read a first segment of a first data track, wherein during the first read, a quality metric is generated at periodic points along the first segment (block 30). After the first read, the read channel is configured into a non-read mode (block 32) for a predetermined interval (block 34). After the predetermined interval, the read channel is configured into the read mode (block 36) in order to second read the first segment of the first data track, wherein during the second read, the quality metric is generated at the periodic points along the first segment (block 38).

In on embodiment, the control circuitry 20 processes a read signal 40 emanating from the head 16 to demodulate the servo sectors $24_0$-$24_N$ and generate a position error signal (PES) representing an error between the actual position of the head and a target position relative to a target track. The control circuitry 20 filters the PES using a suitable compensation filter of a servo control system to generate a control signal 42 applied to a voice coil motor (VCM) 44 which rotates an actuator arm 46 about a pivot in order to actuate the head 16 radially over the disk 18 in a direction that reduces the PES. The servo sectors $24_0$-$24_N$ may comprise any suitable head position information, such as a track address for coarse positioning and servo bursts for fine positioning. The servo bursts may comprise any suitable pattern, such as an amplitude based servo pattern or a phase based servo pattern.

Figure 3:
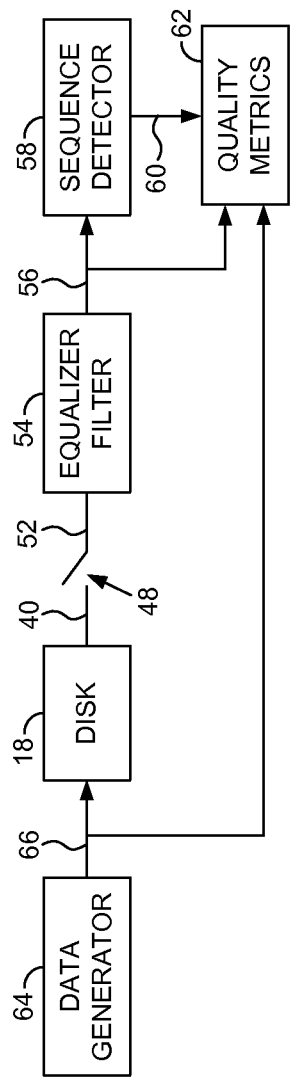
FIG. 3 shows components of a read channel according to an embodiment, including a component for generating quality metrics associated with, for example, an equalizer and/or a sequence detector.

FIG. 3 shows components of an example read channel within the control circuitry 20 of FIG. 2A comprising a sampling device 48 for sampling the read signal 40 to generate signal samples 52, and an equalizer filter 54 for equalizing the signal samples 52 according to a target response (e.g., a partial response). The equalized samples 56 are processed by a sequence detector 58 (e.g., a trellis type detector or an iterative detector) for detecting an estimated data sequence 60 representing data recorded on the disk. The read channel comprises a block 62 for generating quality metrics representing the quality of a read operation, such as quality metrics associated with the equalized signal samples 56 (e.g., sample error), quality metrics associated with the sequence detector 58 (e.g., bit errors, number of iterations, etc.), a flag indicating whether or not a data sector is recoverable, or any other suitable quality metric. The quality metrics may be generated at any suitable resolution along a segment of a data track, such as generating a quality metric at discrete points within a data sector, and/or generating a single quality metric for each data sector.

In the embodiment of FIG. 3, the read channel further comprises a data generator 64 for generating a data pattern 66 written to the disk 18, wherein the data pattern 66 may be processed by block 62 to facilitate generating the quality metrics (e.g., to generate the sample errors and/or bit errors). The read channel may comprise other components not shown in FIG. 3, such as a gain control loop for controlling a gain of the read signal 40, and a timing recovery loop for synchronizing the signal samples 52 to a data rate of the read signal 40.

The quality of a read operation may be affected by a number of different factors, such as the efficacy of the equalizer filter 54, the gain control loop, the timing recovery loop, and the selected target response. In one embodiment, one or more components may be adapted in real-time such as adapting the equalizer filter 54 using a feedback loop in an attempt to optimize the equalized signal samples 56 prior to sequence detection. In another embodiment, the sequence detector 58 may comprise a bank of data dependent noise whitening filters which may also be adapted in real time. In yet another embodiment, the fly height of the head may be adapted using a feedback loop in order to maintain a target fly height of the head during a read operation. In this embodiment, the quality of a read operation may be affected by the convergence speed of the adaptive components and/or the convergence speed of the feedback loops in the read channel at the beginning of a read operation. However, other factors may also affect the quality of a read operation, such as defects on the disk and transient vibrations that may disturb the servo tracking performance.

Accordingly, in one embodiment during an evaluation procedure the control circuitry 20 reads a segment of a track multiple times and generates a quality metric at periodic points along the segment. Prior to reading the segment, the read channel is first configured into a non-read mode and then into a read mode so that the initial performance of the read channel at the beginning of the read operation may be evaluated. An example of this embodiment is shown in FIG. 2C wherein prior to reading a first segment (SEGMENT_1) the read channel is configured into a non-read mode. The read channel is then configured into a read mode and the first segment read while generating associated quality metrics as shown in FIG. 2C. This processes is repeated multiple times, and in one embodiment the resulting quality metrics corresponding to each read operation are combined using any suitable statistical analysis, such as by averaging the corresponding quality metrics. In this manner, poor quality metrics caused by a transient condition during a read operation (e.g., vibration) are effectively filtered out, leaving the quality metrics that may indicate a repetitive problem with one or more read channel components.

For example, if the quality metrics indicate a poor read quality at the beginning of the read operation as illustrated in FIG. 2C, it could indicate an incorrect initialization of a feedback loop (e.g., gain loop, timing loop, fly height loop), and/or suboptimal convergence speed of an adaptive filter (e.g., an adaptive equalizer). In one embodiment, the quality metrics generated during the evaluation procedure are saved and used to modify the design process for a family of disk drives. In another embodiment, the quality metrics may be evaluated by the control circuitry 20 internal to each disk drive and used to modify the operation while deployed in the field. For example, the target response selected for the sequence detector 58 may be modified in order to increase the convergence speed of an adaptive equalizer filter 54 at the beginning of a read operation. In this manner, the quality metrics shown in the example of FIG. 2C may improve on average across the entire segment (by becoming more evenly distributed) even though it may slightly degrade the quality of the read operation for the latter part of the segment. Alternatively, the gain of a feedback loop (signal gain, timing recovery, fly height, etc.) may be increased in order to increase the corresponding convergence speed at the beginning of a read operation while accepting a slightly lower performance after convergence due to higher frequency disturbances. In one embodiment, multiple components of the read channel may be modified (consecutively or concurrently) until the quality metrics are more evenly distributed across the entire segment resulting in an overall improvement in performance.

FIG. 4A illustrates an embodiment wherein multiple segments of a data track may be read during the evaluation procedure and corresponding quality metrics generated for each segment, and in one embodiment, the resulting quality metrics averaged. In this manner, the average quality metrics may better reflect the performance of the read channel components rather than an anomaly of the disk 18, such as a defect in the data area of the disk, a low recording quality of a servo sector, a runout of the servo sectors, or a warping of the disk that may cause a deviation in the fly height of the head 16. Prior to reading each segment of a data track, the read channel is configured into a non-read mode and then back into the read mode in order to evaluate the convergence performance of the read channel components.

FIG. 4A also illustrates an embodiment wherein during the non-read mode, the control circuitry 20 may seek the head 16 away from the data track, and then back to the data track prior to reading each segment. In this embodiment, the performance of the read channel components may be evaluated relative to the performance of the servo control system (i.e., the settle performance). For example, the uneven distribution of the quality metrics shown in FIG. 4A may be due to a suboptimal settle parameter (e.g., excessive overshoot or undershoot) of the servo control system. Accordingly, in one embodiment one or more components of the servo control system (e.g., gain of the compensator) may be modified in order to achieve a settle performance that results in a more evenly distributed quality metrics over the entire segment. That is, modifying the settle parameters may improve the quality metrics at the beginning of a read operation with a slight degradation of the quality metrics later in the read operation.

FIGS. 4A and 4B illustrate an embodiment wherein during a first revolution of the disk 18, the control circuitry 20 reads a first set of segments of the data track and generates a corresponding set of quality metrics, and then during a second revolution of the disk 18, the control circuitry 20 reads a second set of segments of the data track and generates a corresponding set of quality metrics. The seek-away sequence shown in FIG. 4B is inverted from the seek-away sequence shown in FIG. 4A in order to increase the coverage of the data track. This is illustrated in FIG. 4C wherein the quality metrics generated for each segment may be combined to generate a map of quality metrics that covers a significant part of a data track. In one embodiment, all of the resulting quality metrics may be averaged or otherwise statistically processed in order to filter out unwanted anomalies of the disk 18 as described above.

Figure 5:
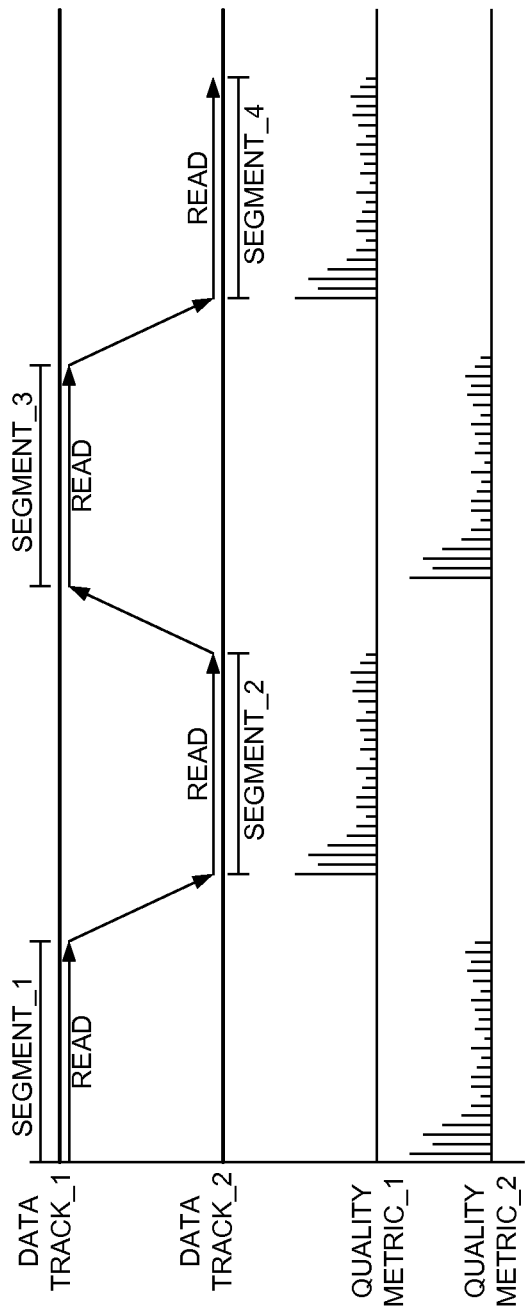
FIG. 5 illustrates an embodiment wherein the control circuitry seeks the head between first and second data tracks in order to generate quality metrics for segments of each data track.

FIG. 5 illustrates an embodiment wherein during the evaluation procedure the control circuitry 20 seeks the head between a first and second data track in order to read a plurality of segments within each data track and generate corresponding quality metrics. While seeking between the data tracks, the read channel is configured into a non-read mode so that at the end of each seek the read channel will have been reset as would occur during normal operation. This embodiment may decrease the evaluation time by generating quality metrics during essentially the entire revolution of the disk. As described above, the resulting quality metrics may be average in order to filter out unwanted anomalies of the disk 18. In one embodiment, the first and second data tracks are separated by a significant number of tracks so that averaging or otherwise statistically processing the quality metrics may help filter out anomalies in either data track. In one embodiment, the evaluation procedure may be executed for a number of different data tracks across the radius of the disk 18 in order to account for disk anomalies that may occur at different radial locations. For example, the force of the disk clamp may cause more warping near the inner diameter of the disk as compared to the outer diameter.

In one embodiment, the control circuitry 20 may execute the evaluation procedure relative to a write operation in order to evaluate the configurable parameters of write circuitry, such as a write fly height of the head, an amplitude of a write current, or a laser power employed in heat assisted magnetic recording (HAMR). This embodiment is understood with reference to the flow diagram of FIG. 6A and the example shown in FIG. 6B wherein a plurality of data tracks are defined relative to the servo tracks (block 68), wherein each data track comprises a plurality of segments. The control circuitry seeks the head to a first data track comprising a first segment followed by a second segment (block 70). When the head reaches the second segment during a first revolution of the disk, the write circuitry is enabled and data is written to the second segment (block 72). During a second revolution of the disk, the first segment is read in order to initialize the read channel (block 74) and after reading the first segment, the second segment is read and a quality metric is generated at periodic points along the second segment (block 76).

Figure 6A:
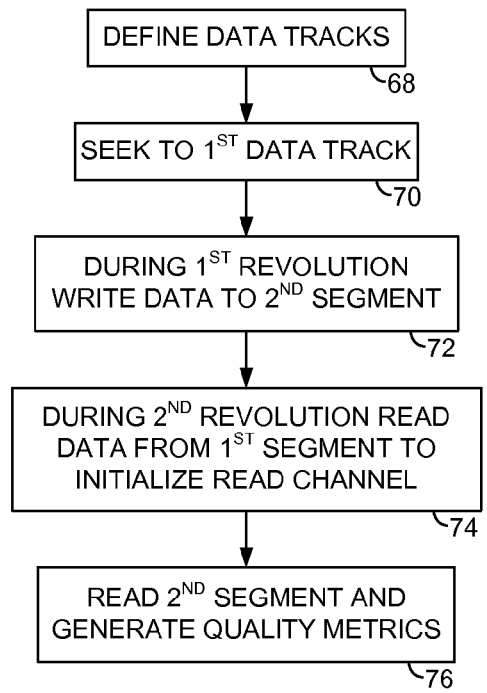
FIG. 6A shows a flow diagram according to an embodiment wherein data is written to a second segment of a first data track and then a first segment is read in order to initialize the read channel prior to reading the second segment and generating quality metrics for the second segment.
Figure 6B:
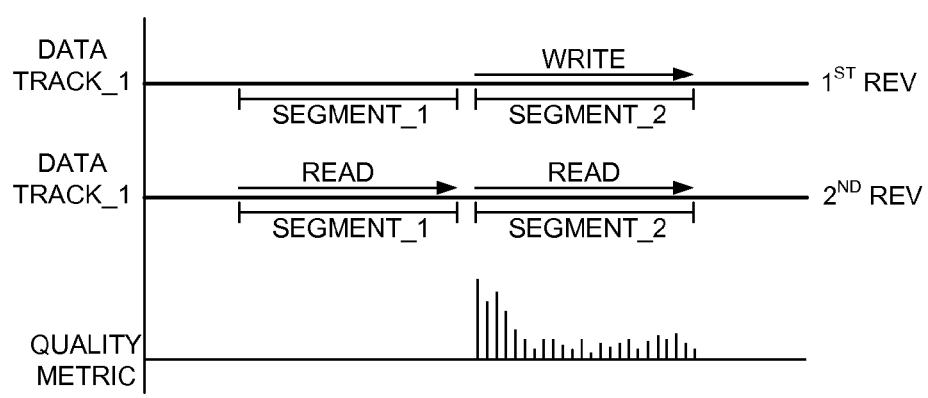
FIG. 6B shows an example wherein the quality metrics indicate a poor write quality at the beginning of a write operation.

In one embodiment, the read channel is initialized at block 78 of FIG. 6A by reading the first segment so that the quality metrics generated while reading the second segment reflect the quality of the write parameters rather than the read parameters. For example, if the head is flying too high or if the laser power of a HAMR disk drive is too low at the beginning of a write operation, it will manifest in the quality metrics generated near the beginning of the written segment as illustrated in the example of FIG. 6B. In one embodiment, the control circuitry 20 may adjust one or more write parameters, such as by increasing a gain of a fly height control loop, or by adjusting a laser power profile for HAMR, so that the quality metrics may improve on average across the entire segment (by becoming more evenly distributed) even though it may slightly degrade the quality of the write operation for the latter part of the segment.

Similar to the embodiment described above with reference to FIG. 4A-4C, the control circuitry may seek the head away from the data track prior to writing a plurality of segments as illustrated in FIG. 6C so that the quality of a write operation may be evaluated relative to the write circuitry as well as parameters of the servo control system. The control circuitry may then adjust one or more parameters of the servo control system in order to improve the resulting quality metrics on average. FIG. 6C also illustrates an embodiment wherein the seek sequence may be inverted during a second revolution of the disk in order to increase the number of segments written. During a third revolution of the disk, all of the segments are read and the quality metrics generated. In one embodiment, the quality metrics generated while reading the first segment may be ignored since the first segment may be used to initialize the read channel. In one embodiment, the control circuitry may first write data (e.g., a periodic pattern) over the entire data track after ensuring the head has completely settled on the data track. Then after the segments of the track are written as shown in FIG. 6C, the gaps between each segment may be read while reading the segments in order to maintain the read channel in an initialized state through the gaps.

FIG. 6D illustrates an embodiment wherein the control circuitry may seek the head between first and second data tracks while writing data to a plurality of segments in each data track. Similar to the embodiment described above with reference to FIG. 5, this embodiment may decrease the evaluation time as well as help account for disk anomalies that may occur at different radial locations. In one embodiment, the control circuitry may first write data (e.g., a periodic pattern) to each data track so that while reading the written segments, the read channel may remain initialized by continuing to read the gaps between the written segments.

In one embodiment, the read channel shown in FIG. 3 may be margined during the evaluation procedure by injecting a noise signal at any suitable point, such as adding a noise signal to the analog read signal 40, or enhancing noise detected in the signal samples 52. This embodiment may help emphasize the quality metrics such as shown in FIG. 2C which may increase the likelihood of detecting problems with the read channel, such as the above described problems with initializing the read channel and/or with initially writing data to the disk.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A disk drive comprising:
   a disk comprising a plurality of servo tracks defined by servo sectors;
   a head actuated over the disk; and
   control circuitry comprising a read channel, the control circuitry operable to:
   define a plurality of data tracks relative to the servo tracks, wherein each data track comprises at least one data segment between consecutive servo sectors;
   configure the read channel into a read mode in order to first read a first data segment of a first data track;
   during the first read, generate a quality metric at periodic points along the first data segment;
   after the first read, configure the read channel into a non-read mode for a predetermined interval;
   after the predetermined interval, configure the read channel into the read mode in order to second read the first data segment of the first data track; and
   during the second read, generate the quality metric at the periodic points along the first data segment,
   wherein during the predetermined interval the control circuitry is further operable to seek the head away from the first data track by at least one data track and then seek the head back to the first data track.

2. The disk drive as recited in claim 1, wherein after seeking the head back to the first data track and prior to second reading the first data segment the control circuitry is further operable to first read a second data segment from the first data track and generate the quality metric at periodic points along the second data segment.

3. The disk drive as recited in claim 1, wherein the control circuitry is further operable to alternate between seeking away from the first data track and back to the first data track in order to read additional data segments and generate a quality metric at periodic points along the additional data segments.

4. The disk drive as recited in claim 1, wherein each point along the first data segment corresponds to a data sector of the first data track.

5. The disk drive as recited in claim 4, wherein the quality metric comprises a flag indicating when the data sector is recoverable.

6. The disk drive as recited in claim 4, wherein the quality metric comprises a number of errors detected in a data sector.

7. The disk drive as recited in claim 4, wherein the control circuitry comprises an iterative data detector operable to detect each data sector over one or more iterations, and the quality metric comprises a number of iterations needed to recover a data sector.

8. The disk drive as recited in claim 1, wherein the control circuitry is further operable to:
   when second seeking the head away from the first data track, seek the head to a second data segment of a second data track; and
   read the second data segment and generate the quality metric at periodic points along the second data segment.

9. A disk drive comprising:
   a disk comprising a plurality of servo tracks defined by servo sectors;
   a head actuated over the disk; and
   control circuitry comprising write circuitry and a read channel, the control circuitry operable to:
   define a plurality of data tracks relative to the servo tracks, wherein each data track comprises at least one data segment between consecutive servo sectors;
   first seek the head to a first data track comprising a first data segment followed by a second data segment;
   when the head reaches the second data segment during a first revolution of the disk, enable the write circuitry and write data to the second data segment;
   during a second revolution of the disk, read the first data segment in order to initialize the read channel and after reading the first data segment, read the second data segment and generate a quality metric at periodic points along the second data segment;
   second seek the head away from the first data track;
   third seek the head to a third data segment of the first data track and write data to the third data segment;
   read the data from the second and third data segments and generate a quality metric at periodic points along the second and third data segments; and
   save each quality metric and a corresponding location within the first data track.

10. The disk drive as recited in claim 9, wherein the control circuitry is further operable to:
    when second seeking the head away from the first data track, seek the head to a fourth data segment of a second data track and write data to the fourth data segment;
    after writing the data to the third data segment of the first data track, seek the head to a fifth data segment of the second data track and write data to the fifth data segment; and
    read the data from the fourth and fifth data segments and generate the quality metric at periodic points along the fourth and fifth data segments.

11. A method of operating a disk drive, the method comprising:
    defining a plurality of data tracks relative to a plurality of servo tracks of a disk, wherein each data track comprises at least one data segment between consecutive servo sectors;
    configuring a read channel into a read mode in order to first read a first data segment of a first data track;

during the first read, generating a quality metric at periodic points along the first data segment;

after the first read, configuring the read channel into a non-read mode for a predetermined interval;

after the predetermined interval, configuring the read channel into the read mode in order to second read the first data segment of the first data track; and during the second read, generating the quality metric at the periodic points along the first data segment, wherein during the predetermined interval the method further comprises seeking a head actuated over the disk away from the first data track by at least one data track and then seeking the head back to the first data track.

12. The method as recited in claim 11, wherein after seeking the head back to the first data track and prior to second reading the first data segment the method further comprises first reading a second data segment from the first data track and generating the quality metric at periodic points along the second data segment.

13. The method as recited in claim 11, further comprising alternating between seeking away from the first data track and back to the first data track in order to read additional data segments and generate a quality metric at periodic points along the additional data segments.

14. The method as recited in claim 11, wherein each point along the first data segment corresponds to a data sector of the first data track.

15. The method as recited in claim 14, wherein the quality metric comprises a flag indicating when the data sector is recoverable.

16. The method as recited in claim 14, wherein the quality metric comprises a number of errors detected in a data sector.

17. The method as recited in claim 14, wherein control circuitry of the disk drive comprises an iterative data detector operable to detect each data sector over one or more iterations, and the quality metric comprises a number of iterations needed to recover a data sector.

18. The method as recited in claim 11, further comprising:
when second seeking the head away from the first data track, seeking the head to a second data segment of a second data track; and
reading the second data segment and generating the quality metric at periodic points along the second data segment.

19. A method of operating a disk drive, the method comprising:
defining a plurality of data tracks relative to a plurality of servo tracks of a disk, wherein each data track comprises at least one data segment between consecutive servo sectors;
first seeking a head to a first data track comprising a first data segment followed by a second data segment;
when the head reaches the second data segment during a first revolution of the disk, enabling write circuitry and writing data to the second data segment;
during a second revolution of the disk, reading the first data segment in order to initialize a read channel and after reading the first data segment, reading the second data segment and generate a quality metric at periodic points along the second data segment;
second seeking the head away from the first data track;
third seeking the head to a third data segment of the first data track and writing data to the third data segment;
reading the data from the second and third data segments and generating a quality metric at periodic points along the second and third data segments; and
saving each quality metric and a corresponding location within the first data track.

20. The method as recited in claim 19, further comprising:
when second seeking the head away from the first data track, seeking the head to a fourth data segment of a second data track and writing data to the fourth data segment;
after writing the data to the third data segment of the first data track, seeking the head to a fifth data segment of the second data track and writing data to the fifth data segment; and
reading the data from the fourth and fifth data segments and generating the quality metric at periodic points along the fourth and fifth data segments.

21. A disk drive comprising:
a disk comprising a plurality of servo tracks defined by servo sectors;
a head actuated over the disk; and
control circuitry comprising a read channel, the control circuitry operable to:
define a plurality of data tracks relative to the servo tracks, wherein each data track comprises at least one data segment between consecutive servo sectors;
configure the read channel into a read mode in order to first read a first data segment of a first data track;
during the first read, generate a quality metric at periodic points along the first data segment;
after the first read, configure the read channel into a non-read mode for a predetermined interval;
after the predetermined interval, configure the read channel into the read mode in order to second read the first data segment of the first data track;
during the second read, generate the quality metric at the periodic points along the first data segment; and
accumulate the quality metrics generated at each point during the first and second read.

22. A method of operating a disk drive, the method comprising:
defining a plurality of data tracks relative to a plurality of servo tracks of a disk, wherein each data track comprises at least one data segment between consecutive servo sectors;
configuring a read channel into a read mode in order to first read a first data segment of a first data track;
during the first read, generating a quality metric at periodic points along the first data segment;
after the first read, configuring the read channel into a non-read mode for a predetermined interval;
after the predetermined interval, configuring the read channel into the read mode in order to second read the first data segment of the first data track;
during the second read, generating the quality metric at the periodic points along the first data segment; and
accumulating the quality metrics generated at each point during the first and second read.

* * * * *